United States Patent
Mohan et al.

(10) Patent No.: US 11,783,717 B2
(45) Date of Patent: Oct. 10, 2023

(54) SYSTEMS AND METHODS FOR IDENTIFYING A NUMBER OF FEASIBLE TARGET TRAFFIC FOR A PAIRED APPROACH

(71) Applicant: HONEYWELL INTERNATIONAL INC., Charlotte, NC (US)

(72) Inventors: Rajeev Mohan, Bangalore (IN); Ravish Udupa, Bangalore (IN); Ruben Carrillo, Peoria, AZ (US); Bhalakrishnan Janardhanan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 337 days.

(21) Appl. No.: 17/065,683

(22) Filed: Oct. 8, 2020

(65) Prior Publication Data

US 2022/0066479 A1     Mar. 3, 2022

(30) Foreign Application Priority Data

Aug. 26, 2020   (IN) .............................. 202011036716

(51) Int. Cl.
  *G08G 5/02*       (2006.01)
  *G06F 3/04817*    (2022.01)
  *G08G 5/00*       (2006.01)

(52) U.S. Cl.
  CPC ......... *G08G 5/025* (2013.01); *G06F 3/04817* (2013.01); *G08G 5/0008* (2013.01); *G08G 5/0021* (2013.01)

(58) Field of Classification Search
  CPC .... G08G 5/025; G08G 5/0008; G08G 5/0021; G06F 3/04817
  See application file for complete search history.

(56) References Cited

U.S. PATENT DOCUMENTS

| | | | |
|---|---|---|---|
| 6,049,754 A | 4/2000 | Beaton et al. | |
| 6,393,358 B1* | 5/2002 | Erzberger | G08G 5/0043 |
| | | | 701/122 |

(Continued)

FOREIGN PATENT DOCUMENTS

| | | |
|---|---|---|
| DE | 60307911 T2 | 4/2007 |
| EP | 3509052 A1 | 1/2019 |

OTHER PUBLICATIONS

Domino David A et al: "Paired approaches to closely spaced runways: Results of pilot and ATC simulation", 2014 IEEE/AIAA 33rd Digital Avionics Systems Conference (DASC), IEEE, Oct. 5, 2014 (Oct. 5, 2014), XP032700788, DOI: 10.1109/DASC.2014.6979404 [retrieved on Dec. 8, 2014].

(Continued)

*Primary Examiner* — Frederick M Brushaber
(74) *Attorney, Agent, or Firm* — Lorenz & Kopf LLP

(57) ABSTRACT

Methods and systems for an aircraft entering a terminal radar approach control (TRACON) airspace to identify a number of feasible target traffic for a paired approach for the aircraft. Traffic data is filtered to identify a plurality of neighbor traffic that are entering the TRACON airspace or within the TRACON airspace when the aircraft is entering the TRACON airspace and estimating, concurrently, for each neighbor traffic of the plurality of neighbor traffic: a trajectory, a traffic arrival time at an ideal location for a respective paired approach with the aircraft, a spacing interval between the neighbor traffic and the aircraft for the respective paired approach, and a respective target location for the aircraft to begin the respective paired approach, as a function of the spacing interval. Based on the estimations, the method identifies feasible, marginally feasible, and infeasible targets, and displays this information in an intuitive lateral display.

20 Claims, 7 Drawing Sheets

(56) References Cited

U.S. PATENT DOCUMENTS

| | | | |
|---|---|---|---|
| 6,584,400 B2 | 6/2003 | Beardsworth | |
| 8,437,949 B2 | 5/2013 | Weitz et al. | |
| 9,142,133 B2 | 9/2015 | Palanisamy et al. | |
| 9,262,930 B2* | 2/2016 | De Prins | G08G 5/0082 |
| 9,384,667 B2* | 7/2016 | Klang | G08G 5/0078 |
| 9,437,112 B1 | 9/2016 | Greene | |
| 9,466,220 B2 | 10/2016 | Mekseev et al. | |
| 9,536,434 B2* | 1/2017 | Scharl | G01C 21/20 |
| 9,711,055 B2* | 7/2017 | Vesely | G05D 1/0676 |
| 10,163,356 B2 | 12/2018 | Britan et al. | |
| 10,446,040 B2 | 10/2019 | Hosamani et al. | |
| 10,497,268 B2 | 12/2019 | Rab et al. | |
| 11,393,348 B1* | 7/2022 | Chartier | G08G 5/0008 |
| 2013/0261945 A1* | 10/2013 | Marcy | G08G 5/0008 701/121 |
| 2017/0352281 A1* | 12/2017 | Donovan | G06F 9/44 |
| 2019/0012925 A1* | 1/2019 | Barker | G08G 5/0013 |
| 2019/0096269 A1* | 3/2019 | Sidiropoulos | G08G 5/0043 |
| 2019/0287413 A1* | 9/2019 | Walton | G08G 5/04 |
| 2020/0075171 A1 | 3/2020 | Lampo et al. | |
| 2020/0168110 A1 | 5/2020 | Khatwa et al. | |

OTHER PUBLICATIONS

Boner. et al: "Paired approach operational concept", 20th DASC. 20th Digital Avionics Systems Conference, vol. 1, Jan. 1, 2001 (Jan. 1, 2001), pp. 5B3/I-5B3/14, XP055880706, DOI: 10.1109/DASC. 2001.963404, ISBN: 978-0-7803-7034-0 Retrieved from the Internet: URL:https://ieeexplore.ieee.org/stampPDF/getPDF.isptp=&arnumber=963404&ref=aHR0cHM6Ly9pZWVIeHBsb3JlLmllZWUub3JnL2RvY3VtZW50Lz.

Leiden, Ken, et al. "Paired Approach Flight Demonstration: Planning and Development Activities," ICNS Apr. 10-12, 2018.

Jones, Denise R., "Collision Avoidance for Airport Traffic Concept Evaluation," downloaded from https://ntrs.nasa.gov/search.jsp?R=20090040474 2020-07-01T05:50:27+00:00z on Jul. 1, 2020.

The Mitre Corporation, "Paired Approach in a Suitcase Integrates FAA and Mitre Capabilities," Nov. 2014.

* cited by examiner

SYSTEMS AND METHODS FOR IDENTIFYING A NUMBER OF FEASIBLE TARGET TRAFFIC FOR A PAIRED APPROACH

CROSS REFERENCE TO RELATED APPLICATION

This application claims priority to Indian Provisional Patent Application No. 202011036716, filed Aug. 26, 2020, the entire content of which is incorporated by reference herein.

TECHNICAL FIELD

The following disclosure relates generally to aircraft display systems, and, more particularly, to systems and methods for an aircraft to identify a number of feasible target traffic for a paired approach for the aircraft.

BACKGROUND

There are several busy airports around the world that have parallel runways that are closely spaced (less than 2500 feet apart). To land on a closely spaced runway, a pilot may fly using visual flight rules or instrument flight rules, depending on environmental conditions. In VFR (Visual Flight Rules) conditions, visual approaches are authorized by the ATC. In visual approaches, the flight crew is primarily responsible for maintaining separation from other aircraft and maintain adequate wake turbulence separation. In IFR (Instrument Flight Rules) conditions, the ATC is responsible for maintaining separation between aircraft. Approaches can be simultaneously conducted to parallel runways when the centerline separation between the runways is at least 700 feet. As may be appreciated, a technical problem is presented in that, in IFR and marginal visual conditions, the runway throughput may drop significantly as aircraft maintain large separations between themselves while landing.

An available solution is a paired approach procedure, which was created to improve runway throughput in these IFR and marginal visual conditions. To facilitate a paired approach procedure (also referred to as a paired approach landing), the ATC detects compatible pairs of aircraft and directs them to the final approach course at a suitable altitude and lateral separation. The trailing aircraft is then expected to maintain a required separation by suitably adjusting its speed before reaching the Final Approach Fix (FAF). The determination of suitable aircraft for paired approach landing is handled by the ATC. Some technical problems remain with the available solution. For example, the aircraft that are descending and entering the terminal area are not aware of the aircraft ahead that they will be paired with, and late notification by ATC about the leading aircraft to be paired with can cause the flight crew to be rushed in their approach preparation during this critical phase of flight. The flight crew has very little time to determine where the spacing goal can be achieved to complete a paired approach while trailing a leading aircraft.

Accordingly, there is a need for pilots to have overview of paired approach feasibility with surrounding traffic and be armed with enough information to optimally negotiate with ATC. Pilots should also be able to do what-if analysis with respect to spacing achievability, speed selection and location for achieving spacing for any aircraft pair. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a processor-implemented method for an aircraft to receive and process weather data and traffic data to identify a number of feasible target traffic for a paired approach for the aircraft. The method includes: generating a trajectory of the aircraft as a function of received aircraft state data and weather data; determining that the aircraft is entering a terminal radar approach control (TRACON) airspace; filtering, by the processor, the received traffic data to identify a plurality of neighbor traffic that are entering the TRACON airspace or are within the TRACON airspace when the aircraft is entering the TRACON airspace; estimating, by the processor, concurrently, for each neighbor traffic of the plurality of neighbor traffic: a trajectory, a traffic arrival time at a location for a respective paired approach with the aircraft, a spacing interval between the neighbor traffic and the aircraft for the respective paired approach, and a respective target location for the aircraft to begin the respective paired approach, as a function of the spacing interval; identifying, by the processor, the number of feasible target traffic as those neighbor traffic for which the aircraft can achieve the respective target location within a prescribed amount of time, based on a current speed of the aircraft; identifying, when the aircraft is not permitted a speed change, infeasible target traffic as those neighbor traffic for which the aircraft cannot achieve the respective target location within the prescribed amount of time, based on the current speed of the aircraft; and presenting on a display unit, a lateral image having each feasible target and each infeasible target indicated with a respective icon depicting a location, a heading and distinguishing its feasibility or infeasibility.

Also provided is a system for an aircraft to receive and process weather data and traffic data to identify a number of feasible target traffic for a paired approach for the aircraft, the system comprising: a display unit; and a controller circuit configured by programming instructions to: generate a trajectory of the aircraft as a function of received aircraft state data; determine that the aircraft is entering a terminal radar approach control (TRACON) airspace; filter the received traffic data to identify a plurality of neighbor traffic that are entering the TRACON airspace or are within the TRACON airspace when the aircraft is entering the TRACON airspace; estimate, concurrently, for each neighbor traffic of the plurality of neighbor traffic: a trajectory, a traffic arrival time at a location for a respective paired approach with the aircraft, a spacing interval between the neighbor traffic and the aircraft for the respective paired approach, and a respective target location for the aircraft to begin the respective paired approach, as a function of the spacing interval; identify the number of feasible target traffic as those neighbor traffic for which the aircraft can achieve the respective target location within a prescribed amount of time, based on a current speed of the aircraft and the respective estimations; identify, when the aircraft is not permitted a speed change, infeasible target traffic as those neighbor traffic for which the aircraft cannot achieve the respective target location within the prescribed amount of time, based on the current speed of the aircraft; and present on the display unit, a lateral image having each feasible target and each infeasible target indicated with a respective icon depicting a location, a heading and its feasibility.

In another embodiment, a method for an aircraft entering a terminal radar approach control (TRACON) airspace to identify a number of feasible target traffic for a paired approach for the aircraft is provided. The method includes: at a controller circuit programmed by programming instructions: receiving weather data; receiving traffic data from a plurality of traffic; filtering the received traffic data to identify a plurality of neighbor traffic that are entering the TRACON airspace or are within the TRACON airspace when the aircraft is entering the TRACON airspace; estimating, concurrently, for each neighbor traffic of the plurality of neighbor traffic that are entering the TRACON airspace or within the TRACON airspace: a trajectory, a traffic arrival time at a location for a respective paired approach with the aircraft, a spacing interval between the neighbor traffic and the aircraft for the respective paired approach, and a respective target location for the aircraft to begin the respective paired approach, as a function of the spacing interval; identifying, based on the estimations, the number of feasible target traffic as those neighbor traffic for which the aircraft can achieve the respective target location within a prescribed amount of time, based on a current speed of the aircraft; and presenting on a display unit, a lateral image having an icon depicting the aircraft, its location, and its heading and having each feasible target indicated with a respective icon depicting a location, a heading and its feasibility.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, to facilitate a paired approach procedure (also referred to as a paired approach landing), the ATC detects compatible pairs of aircraft and directs them to the final approach course at a suitable altitude and lateral separation. The trailing aircraft is then expected to maintain a required separation by suitably adjusting its speed before reaching the Final Approach Fix (FAF). The determination of suitable aircraft for paired approach landing is handled by the ATC. Technical limitations of available solutions result in reduced runway throughput in IFR and marginal visual conditions.

The present disclosure provides a technical solution to the limitations of available solutions, in the form of systems and methods for an aircraft to identify a number of feasible target traffic for a paired approach for the aircraft. The present disclosure provides a pilot with an overview of paired approach feasibility with surrounding traffic and arms the pilot with enough information to optimally negotiate with air traffic control (ATC). Using the information provided by the present disclosure, pilots are able to do what-if analysis with respect to spacing achievability, speed selection and location for achieving spacing for pairing with any potential lead aircraft. The provided systems and methods automate the processes of receiving and processing weather data and traffic data to identify a number of feasible target traffic for a paired approach for the aircraft and presenting this information on a display system. The display system may be onboard the aircraft of part of an electronic flight bag (EFB) or other portable electronic device.

Figure 1:
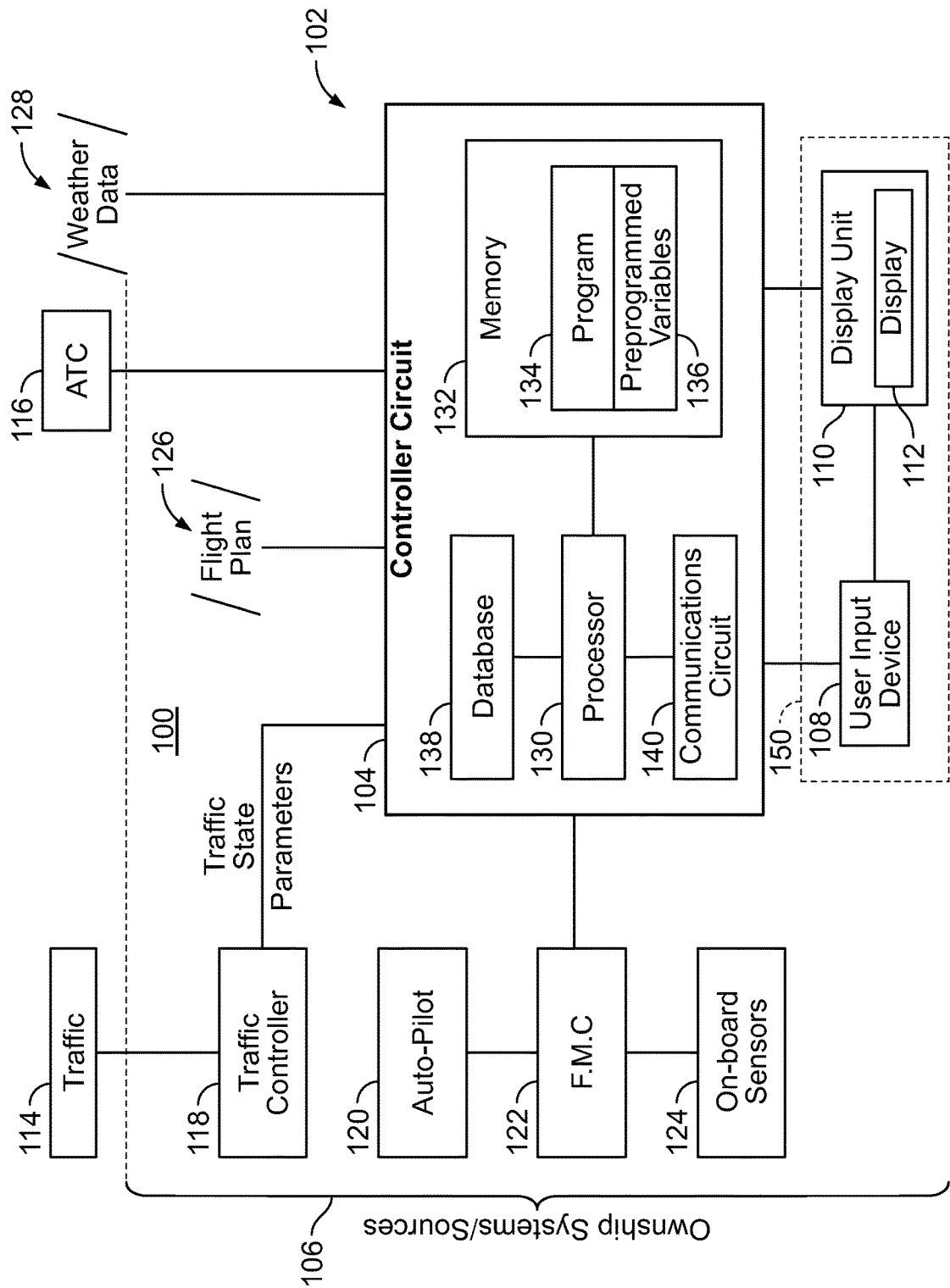
FIG. 1 is a block diagram of a system for an aircraft to receive and process weather data and traffic data to identify a number of feasible target traffic for a paired approach for the aircraft, as illustrated in accordance with an exemplary embodiment of the present disclosure.

FIG. 1 is a block diagram of a system 102 for an aircraft to receive and process weather data and traffic data to identify a number of feasible target traffic for a paired approach for the aircraft (shortened hereinafter to "system 102"), as illustrated in accordance with an exemplary and non-limiting embodiment of the present disclosure. The system 102 may be utilized onboard a mobile platform 100 to provide feasible target traffic for a paired approach for the aircraft, as described herein. In various embodiments, the mobile platform is an aircraft 100, which carries or is equipped with the system 102. As schematically depicted in FIG. 1, system 102 may include the following components or subsystems, each of which may assume the form of a single device, system on chip (SOC), or multiple interconnected devices: a controller circuit 104 operationally coupled to: at least one display unit 110; a user input device 108; and ownship systems/data sources 106. In various embodiments, the system 102 may be separate from or integrated within: a FMS computer and/or a flight control system (FCS). The system 102 may also contain a communications circuit 140 with an antenna, configured to wirelessly transmit data to and receive real-time data and signals from various external sources. In various embodiments, the external sources include traffic 114 for providing traffic data, air traffic control (ATC 116), and a weather forecasting source that provides weather data 128. These functional blocks are described in more detail below.

Although schematically illustrated in FIG. 1 as a single unit, the individual elements and components of the system 102 can be implemented in a distributed manner utilizing any practical number of physically distinct and operatively interconnected pieces of hardware or equipment. When the system 102 is utilized as described herein, the various components of the system 102 will typically all be located onboard the Aircraft 100.

The term "controller circuit," as appearing herein, broadly encompasses those components utilized to carry-out or otherwise perform the processes and/or support the processing functionalities of the system 102. Accordingly, controller circuit 104 can encompass or may be associated with a programmable logic array, and an application specific integrated circuit or other similar firmware, as well as any number of individual processors, flight control computers, navigational equipment pieces, computer-readable memories (including or in addition to memory 132), power supplies, storage devices, interface cards, and other standardized components. In various embodiments, as shown in FIG. 1, the controller circuit 104 may embody one or more processors operationally coupled to data storage having stored therein at least one firmware or software program (generally, a program product or program of computer-readable instructions that embody an algorithm) for carrying-out the various process tasks, calculations, and control/display functions described herein. During operation, the controller circuit 104 may execute an algorithm for receiving and processing weather data 128 and traffic data to identify a number of feasible target traffic for a paired approach for the aircraft 100, and thereby perform the various process steps, tasks, calculations, and control/display functions described herein. In various embodiments, the algorithm is embodied as at least one firmware or software program (e.g., program 134).

Communications circuit 140 is configured to provide a real-time bidirectional wired and/or wireless data exchange for the processor 130 with the ownship data sources 106, the user input device 108, the display unit 110, and the external sources to support operation of the system 102 in embodiments. In various embodiments, the communications circuit 140 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 140 is integrated within the controller circuit 104 as shown in FIG. 1, and in other embodiments, the communications circuit 140 is external to the controller circuit 104.

A variety of ownship data sources 106 and systems may be operationally coupled to the controller circuit 104. In various embodiments, the ownship data sources 106 includes an autopilot system (AP 120), a flight management controller FMC 122, on-board sensors 124, and an autopilot 120. In various embodiments, the ownship systems/data sources 106 additionally includes a traffic controller 118. In various embodiments, a flight plan (FP 126) may be provided by a flight management system (FMS). On-board sensors 124 include flight parameter sensors and geospatial sensors and supply various types of aircraft state data or measurements to controller circuit 104 during aircraft operation. In various embodiments, the aircraft state data (supplied by the on-board sensors 124) include, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. In various embodiments, the aircraft state data (supplied by the on-board sensors 124) additionally includes on-board sensed weather data associated with the immediate surroundings of the aircraft 100.

External sources include one or more other aircraft (also referred to as neighbor traffic, or simply, traffic 114), air traffic control (ATC) 116, and a source of weather data 128. With respect to the present invention, weather data 128 includes meteorological weather information and may be provided by any one or more weather data sources, such as, uplink weather (XM/SXM, GDC/GoDirect Weather), NOTAM/D-NOTAM, TAF, and D-ATIS.

Each traffic 114 of a plurality of traffic 114 encodes and transmits its own state parameters and other identifying information to the aircraft 100 using a traffic communication protocol, such as automatic dependent surveillance broadcast (ADS-B). In various embodiments, a traffic controller 118 receives the data from the plurality of traffic 114 and decodes it using the same communication protocol to thereby associate each neighbor traffic 114 with its respective state parameters. In an embodiment, the controller circuit 104 receives traffic data comprising, for a neighbor traffic, its respective traffic state parameters. In an embodiment, the traffic 114 is one of a plurality of traffic, and the controller circuit 104 receives neighbor traffic data comprising, for each neighbor traffic 114 of the plurality of neighbor traffic 114, their respective traffic state parameters.

On-board the aircraft 100, a flight management controller (FMC 122) may generate commands, such as speed commands, for the autopilot 120. In various embodiments, the controller circuit 104 generates commands for the FMC 122. As will be described in more detail below, the controller circuit 104 may generate commands for the FMC 122 to command the autopilot 120 to increase or decrease speed.

A display unit 110 can include any number and type of image generating devices on which one or more avionic displays 112 may be produced. When the system 102 is utilized for a manned Aircraft, display unit 110 may be affixed to the static structure of the Aircraft cockpit as, for example, a Head Down Display (HDD) or Head Up Display (HUD) unit. Alternatively, display unit 110 may assume the form of a movable display device (e.g., a pilot-worn display device) or a portable display device, such as an Electronic Flight Bag (EFB), a laptop, or a tablet computer carried into the Aircraft cockpit by a pilot.

At least one avionic display 112 is generated on display unit 110 during operation of the system 102; the term "avionic display" defined as synonymous with the term "aircraft-related display" and "cockpit display" and encompasses displays generated in textual, graphical, cartographical, and other formats. The system 102 can generate various types of lateral and vertical avionic displays on which map views and symbology, text annunciations, and other graphics pertaining to flight planning are presented for a pilot to view. In various embodiments, the display unit 110 is configured to continuously render at least a lateral display showing the Aircraft 100 at its current location within the map data. Specifically, embodiments of avionic displays 112 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, the avionic display 112 generated and controlled by the system 102 can include a user input interface, including graphical user interface (GUI) objects and alphanumeric displays of the type commonly presented on the screens of MCDUs, as well as Control Display Units (CDUs) generally.

In various embodiments, a human-machine interface is implemented as an integration of a user input device 108 and a display unit 110. In various embodiments, the display unit 110 is a touch screen display. In various embodiments, the human-machine interface also includes a separate user input device 108 (such as a keyboard, cursor control device, voice input device, or the like), generally operationally coupled to the display unit 110. Via various display and graphics systems processes, the controller circuit 104 may command and control a touch screen display unit 110 to generate a variety of graphical user interface (GUI) objects or elements described herein, including, for example, buttons, sliders, and the like, which are used to prompt a user to interact with the human-machine interface to provide user input; and for the controller circuit 104 to activate respective functions and provide user feedback, responsive to received user input at the GUI element.

With continued reference to FIG. 1, in various embodiments, the controller circuit 104 may take the form of an enhanced computer processer and include a processor 130 and a memory 132. Memory 132 is a data storage that can encompass any number and type of storage media suitable for storing computer-readable code or instructions, such as the aforementioned software program 134, as well as other data generally supporting the operation of the system 102. Memory 132 may also store one or more preprogrammed variables 136 and thresholds, for use by an algorithm embodied in the software program 134. Examples of preprogrammed variables 136 include preprogrammed or prescribed amounts of time and distances described below.

In various embodiments, the system 102 may employ one or more database(s) 138; they may be integrated with memory 132 or separate from it. In various embodiments, two- or three-dimensional map data may be stored in a database 138, including airport features data, geographical (terrain), buildings, bridges, and other structures, street maps, and navigational databases, which may be updated on a periodic or iterative basis to ensure data timeliness. This map data may be uploaded into the database 138 at an initialization step and then periodically updated, as directed by either a program 134 update or by an externally triggered update.

In various embodiments, aircraft-specific parameters and information for aircraft 100 may be stored in the database 138 and referenced by the program 134. Non-limiting examples of aircraft-specific information includes an aircraft weight and dimensions, performance capabilities, configuration options, and the like. In an embodiment, minimum radar separation requirements for various aircraft may be stored in the database 138 and referenced by the program 134. Table 1, which is referenced further below, provides an example of minimum radar separation requirements for various aircraft.

Figure 2:
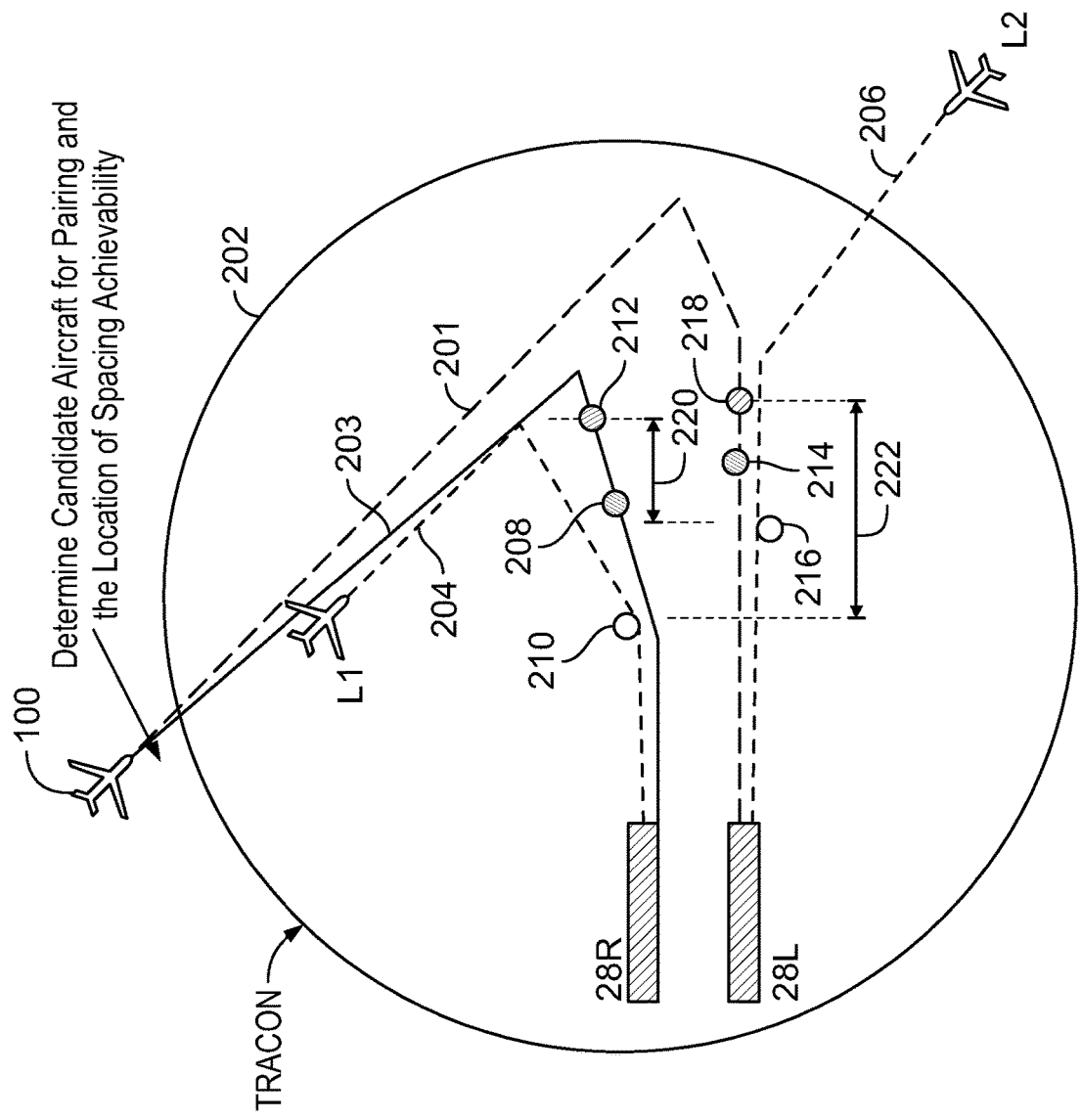
FIG. 2 is an example showing two neighbor traffic for analysis, as illustrated in accordance with an exemplary embodiment of the present disclosure.

We turn now to FIG. 2 to describe the operation of the system 102. The controller circuit 104 is configured by programming instructions to perform the functions and tasks attributed to the system 102. The controller circuit 104 determines a feasible traffic for pairing based on a current speed of the aircraft 100. The controller circuit 104 identifies the number of feasible target traffic as those neighbor traffic for which the aircraft 100 can achieve the respective target location within a prescribed amount of time, based on a current speed of the aircraft 100. The controller circuit 104 identifies infeasible target traffic as those neighbor traffic for which the aircraft 100 cannot achieve the respective target location within the prescribed amount of time, based on the current speed of the aircraft 100 and when the aircraft 100 is not permitted a speed change.

FIG. 2 is a simplified illustration for the purpose of describing operations of the system 102. In FIG. 2, two neighbor aircraft are identified as feasible target traffic; in practice, there may be many more traffic and many more identified feasible target traffic. In various embodiments, a first neighbor aircraft (L1) is shown inside the terminal radar approach control (TRACON) airspace 202 and having a flight path 204 to a runway 28R. A second neighbor aircraft (L2) is shown outside the TRACON airspace 202, but heading toward it, and having a flight path 206 to a runway 28L. Each of the neighbor aircraft L1 and L2 are referred to as leading aircraft, because they are ahead of the aircraft 100. In an embodiment, an icon depicting the aircraft 100, its location and heading, is shown entering a terminal radar approach control (TRACON) airspace 202.

In order to perform the analysis, the controller circuit 104 generates a trajectory of the aircraft 100 as a function of available data from onboard ownship data sources 106, such as the aircraft state data, the FP 126, and weather data 128. Comparing a current position of the aircraft to available map data, the controller circuit 104 can determine that the aircraft is entering the TRACON airspace. The controller circuit 104 receives traffic data and filters the received traffic data, using the traffic state parameters, to identify a plurality of neighbor traffic that are entering the TRACON airspace or are within the TRACON airspace when the aircraft 100 is entering the TRACON airspace (in this example, the plurality of neighbor traffic is illustrated with L1 and L2).

The system 102 employs a spacing requirement (the spacing requirement may include a spacing interval and a location) in the evaluation of the neighbor traffic for feasibility of pairing. The spacing interval may be referred to as an amount of time or as a distance. The system 102 can receive the spacing requirements from ATC commands or from a user, such as the pilot, such as, after hearing or reading an ATC command. The ATC spacing requirement can reflect traffic density, weight class of participating aircraft, expected turbulence, etc. If no entry is made for a spacing requirement, the system 102 will default to the final approach fix (FAF) as the location where spacing needs to be achieved.

In operation, the controller circuit 104 processes available data and estimates, concurrently, for each neighbor traffic of the plurality of neighbor traffic: a trajectory, a traffic arrival time at an ideal location for a respective paired approach with the aircraft, a spacing interval between the neighbor traffic and the aircraft for the respective paired approach, and a respective target location for the aircraft to begin the respective paired approach, as a function of the spacing interval (collectively referred to as the estimated information). With respect to FIG. 2, the elements of the estimated information are defined as follows.

The estimated trajectory of L1 is 204 and the estimated trajectory of L2 is 206. For the aircraft 100 to perform a paired approach landing (of the type target straight approach) with L1, that means L1 lands on runway 28R and the aircraft 100 lands on runway 28L, utilizing a first desired spacing interval 222, indicated in distance from L1 at location 210. In this example, location 210 is, for L1, an ideal location for a respective paired approach with the aircraft 100. In the figure, the aircraft 100, using trajectory 201, is shown following L1 with the first desired spacing interval by the time aircraft 100 arrives at location 218, which is prior to location 214, which is a latest possible location for this paired approach. In this example, location 218 is a target location for the aircraft to begin the respective paired approach with L1. The target location 218 is a function of the spacing interval 222 and an estimated traffic arrival time of L1 at location 210.

For the aircraft 100 to perform a paired approach (of the type SOIA, simultaneous offset instrument approach) with L2, this means L2 lands on runway 28L and the aircraft 100 lands on runway 28R, utilizing a second desired spacing interval 220, indicated in distance from L2 at location 216. In this example, location 216 is, for L2, an ideal location for a respective paired approach with the aircraft 100. In the figure, the aircraft 100, using trajectory 203, is shown following L2 with the second desired spacing interval by the time aircraft 100 arrives at location 212, which is prior to location 208, which is a latest possible location for this paired approach. In this example, location 212 is a target location for the aircraft to begin the respective paired approach with L2. The target location 212 is a function of the spacing interval 220 and an estimated traffic arrival time of L2 at location 216.

Figure 3:
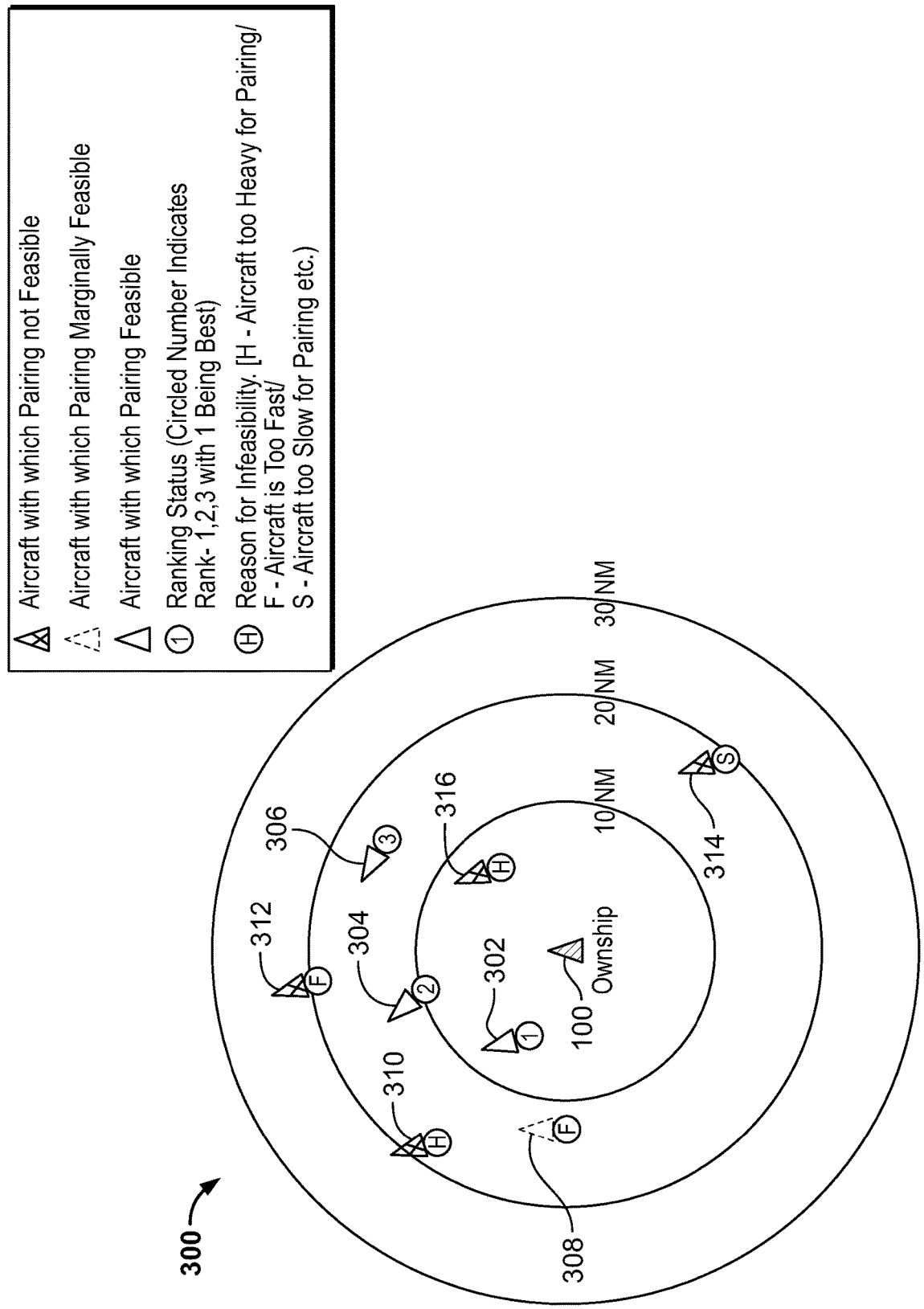
FIG. 3 is an illustration of a lateral display showing neighbor traffic categorized according to feasibility, as illustrated in accordance with an exemplary embodiment of the present disclosure.

Turning now to FIG. 3, the controller circuit 104 presents, on the display unit 110, a lateral image 300. In an embodiment, the controller circuit 104 presents, on the display unit 110, a lateral image 300 having each feasible target (302, 304, 306, 308) with a respective icon depicting a location, a heading and distinguishing its feasibility. In an embodiment, the controller circuit 104 presents, on the display unit 110, a lateral image 300 having each feasible target (302, 304, 306, 308) and each infeasible target (310, 312, 314, 316) indicated with a respective icon depicting a location, a heading and distinguishing its feasibility or infeasibility. The system 102 employs a visualization technique that makes these three categories visually and intuitively distinguishable from each other. In the example of FIG. 3, the neighbor traffic are each represented with triangles with their narrow point in the direction of their heading. The feasible traffic are each outlined with a solid line, and the infeasible traffic each have an X. Marginally feasible traffic (described below) are outlined with a dashed line. In other embodiments, other visualization techniques make be used, for example, using colors to indicate feasibility (for example, green for feasible, yellow for marginally feasible, and red for infeasible).

In some embodiments, the aircraft 100 may be permitted a speed change. When the aircraft 100 cannot achieve the respective target location within the prescribed amount of time, based on the current speed of the aircraft 100, the controller circuit 104 may determine an interval error between the respective target location and an actual location of the aircraft at an expiration of the prescribed amount of time. The controller circuit 104 may then use the interval error to compute a speed change required for the aircraft 100 to achieve the respective target location within the prescribed amount of time; hence, the speed change required is a function of the interval error.

The controller circuit 104 determines whether the speed change is permissible. Factors considered in the determination of permissible speed change include aircraft-specific capabilities of aircraft 100, traffic congestion in the area, weather, and the like. The controller circuit 104 may identify a given neighbor traffic as marginally feasible target traffic when the speed change is permissible. As shown in FIG. 3, the controller circuit 104 may present, on the display unit 110, each of the marginally feasible target traffic (e.g., 308), indicated with a respective icon depicting its location, heading and that it is a marginally feasible target traffic.

In various embodiments, the controller circuit 104 further determines, for each feasible target traffic, an overall feasibility rank based on its weight class and its speed, with a ranking of 1 being the most suitable, and displays in the lateral image 300 a number alongside each icon for feasible target traffic, the number reflecting a rank in overall feasibility. In FIG. 3, feasible target 302 is ranked 1, feasible target 304 is ranked 2, and feasible target 306 is ranked 3. In various determinations, such as overall rank, and the previously described spacing intervals, a weight class of the lead aircraft (e.g. neighbor aircraft herein) and ownship aircraft 100 may be processed with other data. A table such as Table 1, below, may be referenced to determine feasibility/infeasibility and for separation requirements. In various embodiments, the information of Table 1 may be stored in the memory 132, potentially as preprogrammed variables 136. As may be appreciated, the minimum radar separation may be converted between distance and time, using current speeds.

TABLE 1

| Preceding aircraft (Lead or target) weight class | Following aircraft weight class | Minimum Radar Separation |
| --- | --- | --- |
| Super | Super | 4 NM (Nautical Miles) |
|  | Heavy | 6 NM |
|  | Large | 7 NM |
|  | Small | 8 NM |
| Heavy or a Boeing 757 | Heavy | 4 NM |
|  | Large | 5 NM |
|  | Small | 6 NM |
| Large (Excluding the Boeing 757) | Small | 4 NM |

In various embodiments, the controller circuit 104 further determines, for the infeasible traffic, a reason for infeasiblity from among a plurality of reasons. For example, the infeasible traffic may be traveling too fast, traveling too slow, or be in too heavy of a weight class. The controller circuit 104 may indicate the infeasibility determinations on the lateral image 300 with a label that indicates the reason. In FIG. 3, infeasible target 310 and infeasible target 316 are labeled H for too heavy, infeasible target 312 is labeled F for too fast and infeasible target 314 is labeled S for too slow.

In various embodiments, in addition to the lateral image described above, the system 102 generates and displays a graphical user interface (GUI) that provides alphanumeric information related to the above described determinations. The GUI may be rendered in a dedicated area on the lateral image, or on a separate display unit. The displaying of the GUI may be responsive to detecting a user selection of a neighbor traffic on the lateral image 300, and then the system 102 responds to the user selection by displaying information including the estimated information for the selected neighbor traffic. Using the information provided by the GUI, pilots are able to do what-if analysis with respect to spacing achievability, speed selection and location for achieving spacing for pairing with any potential lead aircraft.

Figure 4:
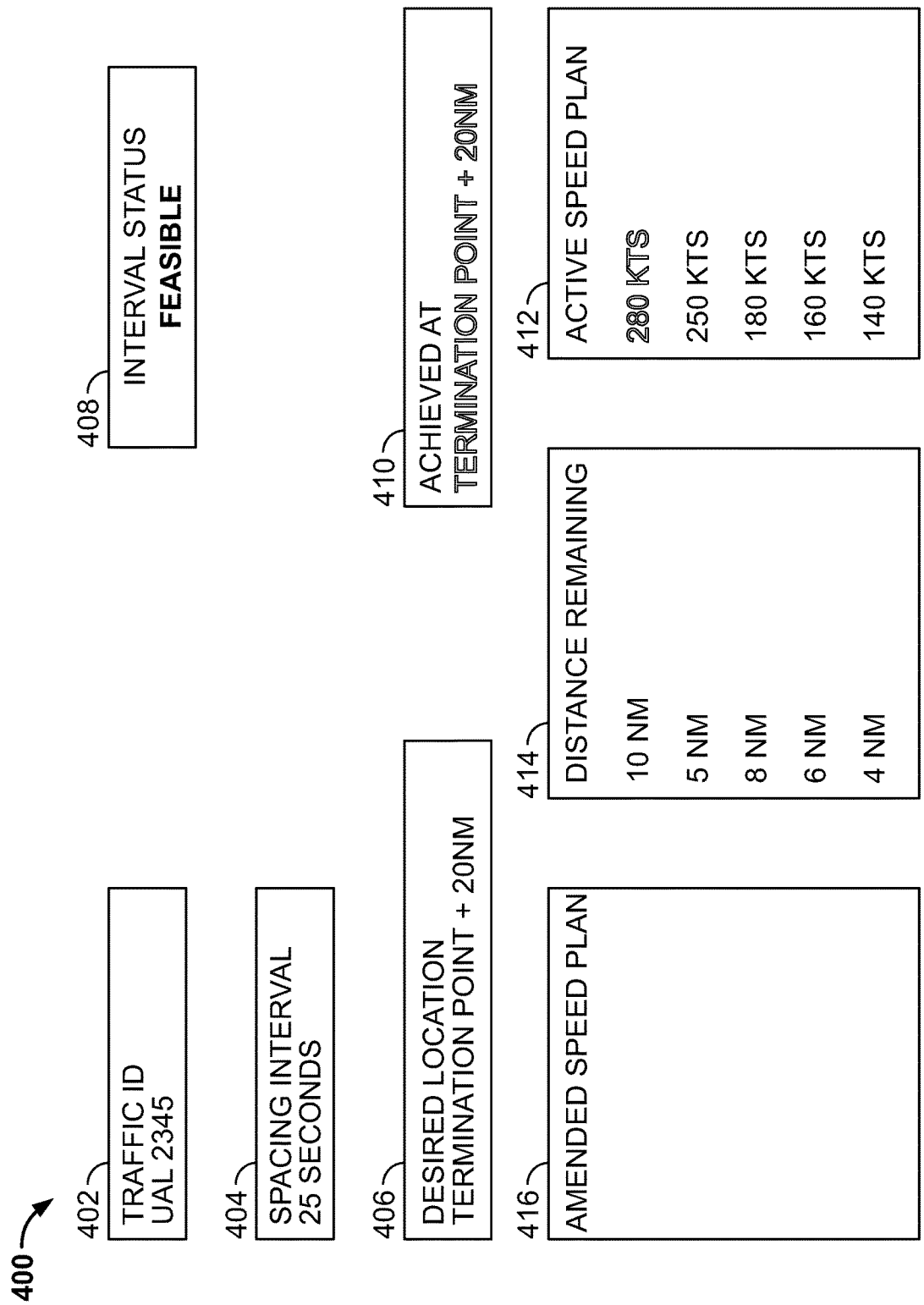
FIGS. 4-5 are illustrations of a graphical user interface that may be displayed, as illustrated in accordance with an exemplary embodiment of the present disclosure.
Figure 5:
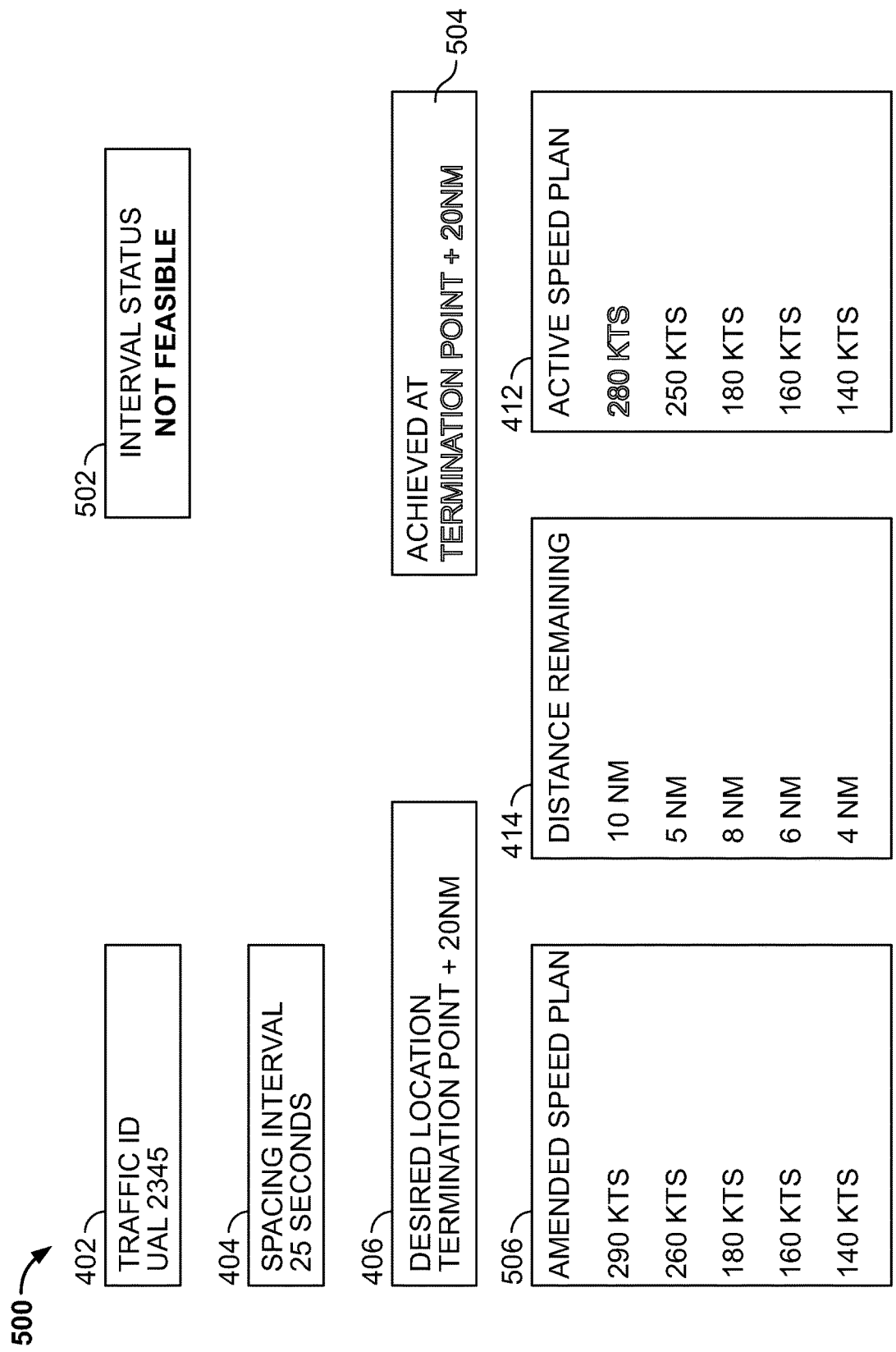

Turning now to FIGS. 4 and 5, GUI 400 and GUI 500 are described. Neighbor traffic UAL2345 has been selected. GUI 400 and GUI 500 display the identification of the selected traffic in the traffic identification text box 402 and a spacing interval of 25 seconds is displayed in the spacing interval box. A desired location of termination point plus 20 nautical miles is depicted in text box 406. In text box 408, the system 102 has determined that the spacing interval (text box 404) for this traffic id (text box 402) at this desired location (text box 406) are feasible, and the word "feasible" is displayed. The achieved at location (text box 410) is the same as the desired location. An active speed plan in text box 412 can be aligned with the distance remaining entries in text box 414 to view a ramp down in speed from 280 KTS with a distance remaining of 10 NM down to 140 KTS at a distance remaining of 4 NM.

In a contrasting example for the same traffic identification 402, in FIG. 5, the system 102 has determined that the interval status 502 is "not feasible," as shown. An amended speed plan is calculated by the system 102 and displayed in text box 506. The amended speed plan indicates speed changes, determined by the processor, required to reach a required speed at a minimum distance remaining. In the example, the required speed at a minimum distance remaining is 140 KTS at 4 NM. A comparison of the entries in text box 506 to those in text box 412 for the distance remaining points in box 414, shows the increase in speed required. Speed would have to be increased to 290 KTS at the distance remaining of 10 NM and to 260 KTS at the distance remaining of 5 NM; after that, the amended speed plan matches the active speed plan. However, the pairing could not occur at the desired location shown in box 406, instead it would not occur until the termination point plus 15 NM. In the example of FIG. 5, the increased speed was not determined permissible and therefore the traffic is identified as not feasible for pairing.

Figure 6:
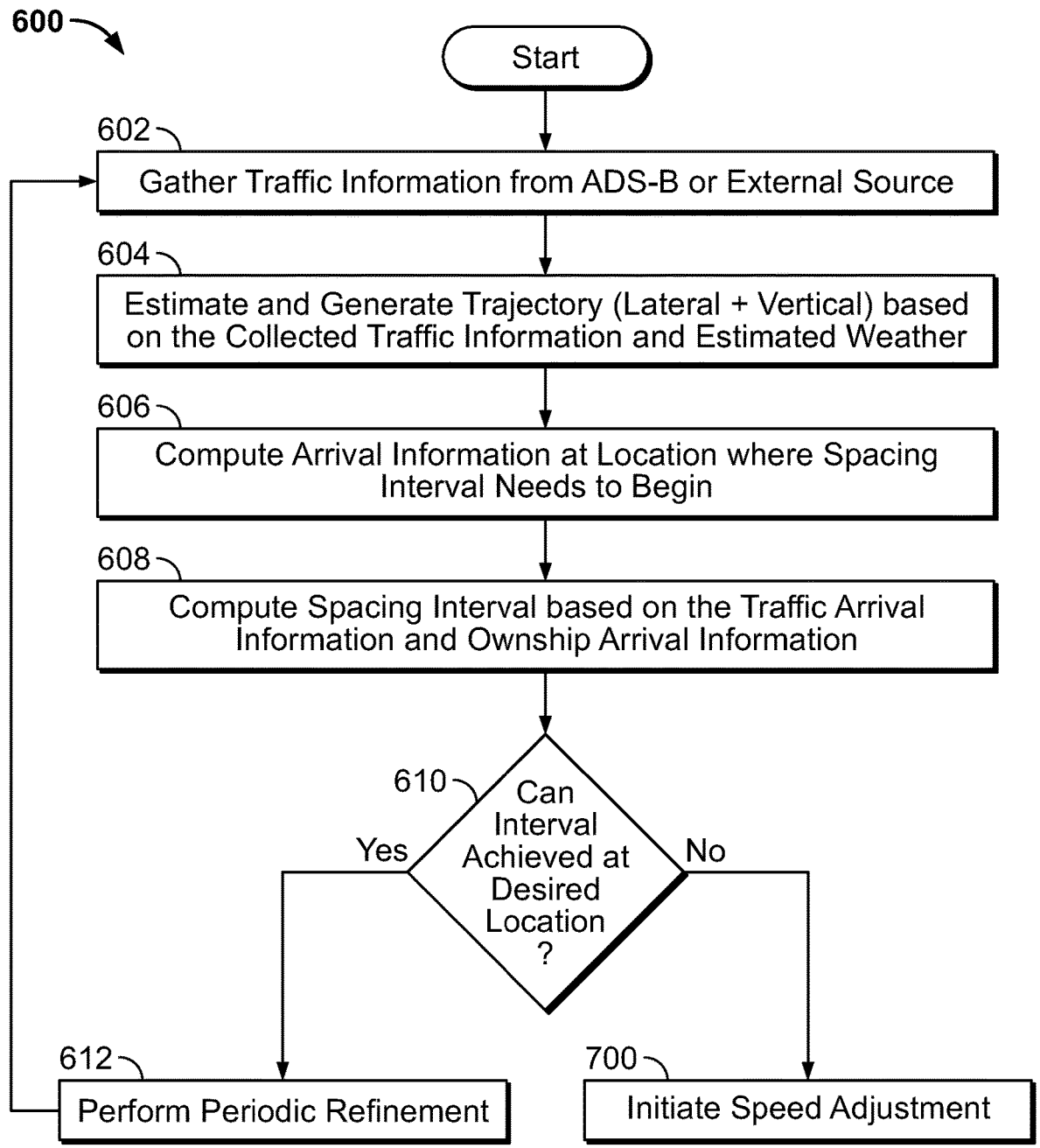
FIGS. 6-7 are a flow chart of a method for an aircraft to receive and process weather data and traffic data to identify a number of feasible target traffic for a paired approach for the aircraft, as may be implemented by the system of FIG. 1, in accordance with an exemplary embodiment of the present disclosure.
Figure 7:
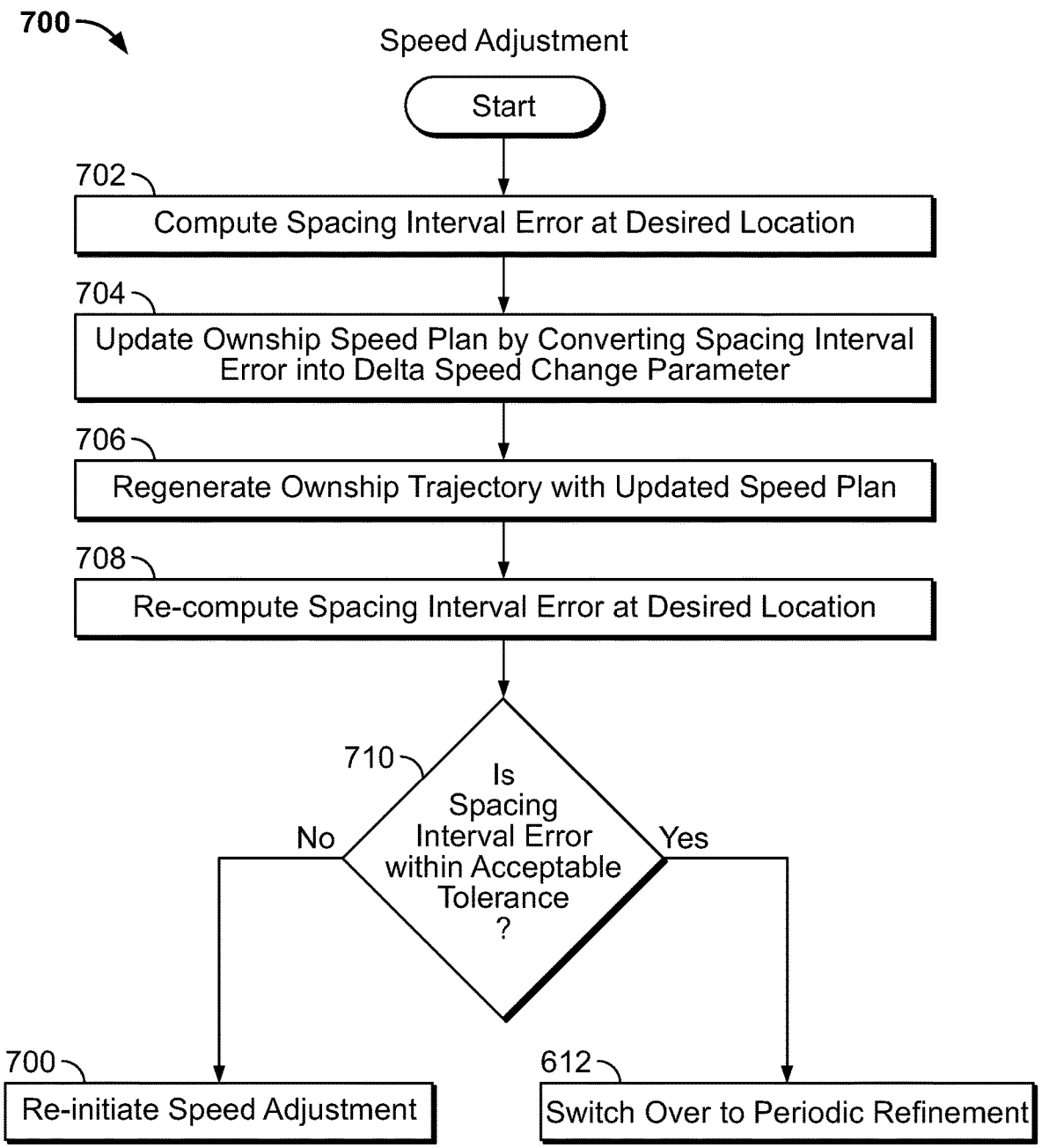

Turning now to FIGS. 6-7, the system 102 described above may be implemented by a processor-executable method 600. For illustrative purposes, the following description of method 600 may refer to elements and modules mentioned above in connection with FIGS. 1-5. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

At 602, the system 102 has already been initialized. Initialization may include loading instructions and program 134 into a processor within the controller circuit 104, as well as loading preprogrammed variables 136, map data, weight class specifications, and aircraft-specific features into one or more database(s) 138.

At 602 the system 102 gathers or receives from external sources traffic data as well as weather data, and a flight plan. The system 102 may use ADS-B for traffic data transmissions. In some embodiments, at 602 the system 102 also receives ATC commands.

At 604, the system 102 estimates and generates lateral and vertical trajectories for the neighbor traffic based on data collected at 602. At 606, after filtering the received traffic data to identify a plurality of neighbor traffic that are entering the TRACON airspace or within the TRACON airspace when the aircraft is entering the TRACON airspace, the system 102 computes arrival information for the traffic at the respective locations where the spacing interval needs to begin. At 608, the system 102 computes the spacing interval based on the traffic arrival information and ownship capabilities. As one may appreciate, the spacing interval may be converted back and forth between a time and a distance, depending on how it is used. At 610, the system 102 determines whether the spacing interval can be achieved at the desired location. If yes at 610, the system 102 performs periodic assessments and refinements to the commands from the flight management controller 122 to the AP 120. If no at 610, the system 102 begins speed adjustment 700.

Speed adjustment 700 includes computing a spacing interval error at the desired location at 702 and updating ownship speed plan by converting the spacing interval error into a delta speed change parameter (i.e., the increased speed that is needed) at 704. At 706, the ownship trajectory is regenerated with the updated speed plan. The Amended speed plan 416 of FIG. 5 is an example of an updated speed plan. At 708, the spacing interval error at the desired location is re-computed. At 710, the system 102 determines whether the re-computed spacing interval is within an acceptable tolerance. If yes at 710, the system 102 switches back to periodic refinement 612. If no at 710, the system 102 may re-initiate speed adjustments by returning to 700, or end.

Thus, enhanced systems and methods for an aircraft to identify a number of feasible target traffic for a paired approach for the aircraft are provided. By processing traffic data with the aircraft-specific ownship data (from ownship data sources 106), the system 102 is able to not only identify a number of feasible target traffic for a paired approach for the aircraft, but also provide useful information such as a feasibility rank for feasible traffic, and reasons for infeasibility for other traffic, on an easy to comprehend visual display, providing an objectively improved human-machine interface.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program or software application that includes program 134) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A processor-implemented method for an aircraft to identify a number of feasible target traffic for a paired approach for the aircraft, the method comprising:
receiving, at a traffic controller of the aircraft, traffic data from a first plurality of neighboring aircraft via a communication circuit of the aircraft, the traffic data received from each neighboring aircraft comprising an aircraft identifier and aircraft state parameters;
receiving a trajectory of the aircraft from a flight management controller (FMC) of the aircraft, the trajectory of the aircraft being a function of aircraft state data received from at least one onboard sensor of the aircraft;
determining that the aircraft is entering a terminal radar approach control (TRACON) airspace based on aircraft location data received from the at least one onboard sensor;
receive a current speed of the aircraft from the at least one onboard sensor;
filtering, by the processor of the aircraft, the traffic data received from the first plurality of neighboring aircraft to identify a second plurality of neighboring aircraft that are entering the TRACON airspace or are within the TRACON airspace when the aircraft is entering the TRACON airspace;
estimating, by the processor of the aircraft, concurrently, for each of the second plurality of neighboring aircraft:
a trajectory, a traffic arrival time at a location for a respective paired approach with the aircraft, a spacing interval between the neighbor traffic and the aircraft for the respective paired approach, and a respective target location for the aircraft to begin the respective paired approach, as a function of the spacing interval and the traffic data received from each of the second plurality of neighboring aircraft;
identifying, by the processor of the aircraft, the number of feasible target traffic from the second plurality of neighboring aircraft those neighboring aircraft for which the aircraft can achieve the respective target location within a prescribed amount of time, based on the current speed of the aircraft;
identifying, by the processor of the aircraft, infeasible target traffic as those neighbor traffic for which the aircraft cannot achieve the respective target location within the prescribed amount of time, based on the current speed of the aircraft; and
presenting on a cockpit display unit of the aircraft, a lateral image having each feasible target traffic and each infeasible target traffic indicated with a respective icon depicting a location, a heading and distinguishing its feasibility or infeasibility.

2. The method of claim 1, further comprising:
when the aircraft is permitted a speed change, and for each of those neighboring aircraft from the second plurality of neighboring aircraft for which the aircraft cannot achieve the respective target location within the prescribed amount of time, based on the current speed of the aircraft,
determining, by the processor of the aircraft, an interval error between the respective target location and an actual location of the aircraft at an expiration of the prescribed amount of time;
computing a speed change required for the aircraft to achieve the respective target location within the prescribed amount of time, the speed change required being a function of the interval error;
determining whether the speed change required is permissible;
identifying the neighboring aircraft from the second plurality of aircraft as marginally feasible target traffic when the speed change is permissible; and
presenting on the cockpit display unit, each of the marginally feasible target traffic, indicated with a respective icon depicting its location, heading and distinguishing that it is a marginally feasible target.

3. The method of claim 1, further comprising, presenting on the cockpit display unit of the aircraft an icon depicting the aircraft, its location, and its heading.

4. The method of claim 1, wherein each icon has a triangular shape and a color, and wherein a point in the triangle indicates the heading, and the color indicates the feasibility.

5. The method of claim 1, further comprising determining, by the processor, for each feasible target traffic, an overall feasibility based on its weight and its speed.

6. The method of claim 5, further comprising: displaying a number alongside each icon for feasible target traffic, the number reflecting a rank in overall feasibility.

7. The method of claim 1, wherein each infeasible target traffic is labeled to indicate whether the infeasible target traffic is too heavy, too fast or too slow.

8. The method of claim 1, further comprising:
detecting a user input selecting a traffic on the lateral image; and
displaying a graphical user interface (GUI) with estimated information about the selected traffic responsive to the selection; and
wherein the GUI includes a text box indicating the feasibility or infeasibility of the selected traffic and a text box with an active speed plan.

9. The method of claim 8, further comprising, when the selected traffic is infeasible or marginally feasible, displaying on the GUI a text box with an amended speed plan that indicates speed changes, determined by the processor, required to reach a required speed at a minimum distance remaining.

10. An onboard system for an aircraft to identify a number of feasible target traffic for a paired approach landing for the aircraft, the system comprising:
a flight management controller (FMC);
at least one onboard sensor;
a communication circuit;
a traffic controller configured to receive traffic data from a first plurality of neighboring aircraft via the communication circuit, the traffic data received from each neighboring aircraft comprising an aircraft identifier and aircraft state parameters;
a cockpit display unit; and
a controller circuit configured by programming instructions to:
receive a trajectory of the aircraft from the FMC, the trajectory of the aircraft being a function of aircraft state data received from the at least one onboard sensor;
determine that the aircraft is entering a terminal radar approach control (TRACON) airspace based on aircraft location data received from the at least one onboard sensor;
receive a current speed of the aircraft from the at least one onboard sensor;
filter the traffic data received from the first plurality of neighboring aircraft to identify a second plurality of neighboring aircraft that are entering the TRACON airspace or are within the TRACON airspace when the aircraft is entering the TRACON airspace;

estimate, concurrently, for each of the second plurality of neighboring aircraft:

a trajectory, a traffic arrival time at a location for a respective paired approach with the aircraft, a spacing interval between the neighboring aircraft and the aircraft for the respective paired approach, and a respective target location for the aircraft to begin the respective paired approach, as a function of the spacing interval and the traffic data received from each of the second plurality of neighboring aircraft;

identify the number of feasible target traffic from the second plurality of neighboring aircraft those neighboring aircraft for which the aircraft can achieve the respective target location within a prescribed amount of time, based on the current speed of the aircraft;

identify as infeasible target traffic those the neighboring aircraft from the second plurality of aircraft that cannot achieve the respective target location within the prescribed amount of time, based on the current speed of the aircraft; and present on the cockpit display unit, a lateral image having each feasible target traffic and each infeasible target traffic indicated with a respective icon depicting a location, a heading and its feasibility.

11. The system of claim 10, wherein the controller circuit is further configured to:

when the aircraft is permitted a speed change, and for each of those neighboring aircraft of the second plurality of neighboring aircraft for which the aircraft cannot achieve the respective target location within the prescribed amount of time, based on the current speed of the aircraft, determine an interval error between the respective target location and an actual location of the aircraft at an expiration of the prescribed amount of time;

compute a speed change required for the aircraft to achieve the respective target location within the prescribed amount of time, the speed change required being a function of the interval error;

determine whether the speed change required is permissible;

identify the neighboring aircraft of the second plurality of neighboring aircraft as marginally feasible target traffic when the speed change is permissible; and present on the lateral image, each of the marginally feasible target traffic, indicated with a respective icon depicting its location, heading and that it is a marginally feasible target traffic.

12. The system of claim 10, wherein the controller circuit is further configured to present on the cockpit display unit an icon depicting the aircraft, its location, and its heading.

13. The system of claim 12, wherein each icon has a triangular shape and a color, and wherein a point in the triangle indicates the heading, and the color indicates the feasibility.

14. The system of claim 11, wherein the controller circuit is further configured to: determine, for each feasible target traffic, an overall feasibility based on its weight and its speed.

15. The system of claim 14, wherein the controller circuit is further configured to display, on the lateral image, a number alongside each icon for feasible target traffic, the number reflecting a rank in overall feasibility.

16. The system of claim 15, wherein the controller circuit is further configured to label, on the lateral image, each infeasible target traffic to indicate whether the infeasible target traffic is too heavy, too fast or too slow.

17. The system of claim 16, wherein the controller circuit is further configured to:

detect a user input selecting a traffic on the lateral image; and display a graphical user interface (GUI) with estimated information about the selected traffic responsive to the selection; and wherein the GUI includes a text box indicating the feasibility or infeasibility of the selected traffic and a text box with an active speed plan.

18. The system of claim 16, wherein the controller circuit is further configured to, when the selected traffic is infeasible or marginally feasible:

display on the GUI a text box with an amended speed plan that indicates speed changes, determined by the processor, required to reach a required speed at a minimum distance remaining.

19. A method for an aircraft entering a terminal radar approach control (TRACON) airspace to identify a number of feasible target traffic for a paired approach for the aircraft, the method comprising:

at a controller circuit of the aircraft programmed by programming instructions:

receiving, at a traffic controller of the aircraft, traffic data from a first plurality of neighboring aircraft via a communication circuit of the aircraft, the traffic data received from each neighboring aircraft comprising an aircraft identifier and aircraft state parameters;

receiving a trajectory of the aircraft from a flight management controller (FMC) of the aircraft, the trajectory of the aircraft being a function of aircraft state data received from at least one onboard sensor of the aircraft;

determining that the aircraft is entering the TRACON airspace based on aircraft location data received from the at least one onboard sensor;

receive a current speed of the aircraft from the at least one onboard sensor;

filtering the traffic data received from the first plurality of neighboring aircraft to identify a second plurality of neighboring aircraft that are entering the TRACON airspace or are within the TRACON airspace when the aircraft is entering the TRACON airspace;

estimating, concurrently, for each of the second plurality of neighboring aircraft that are entering the TRACON airspace or within the TRACON airspace:

a trajectory, a traffic arrival time at a location for a respective paired approach with the aircraft, a spacing interval between the neighbor traffic and the aircraft for the respective paired approach, and a respective target location for the aircraft to begin the respective paired approach, as a function of the spacing interval and the traffic data received from each of the second plurality of neighboring aircraft;

identifying, based on the estimations, the number of feasible target traffic from the second plurality of neighboring aircraft those neighboring aircraft for which the aircraft can achieve the respective target location within a prescribed amount of time, based on the current speed of the aircraft; and presenting on a cockpit display unit of the aircraft, a lateral image having an icon depicting the aircraft, its location, and its heading and having each feasible target traffic indicated with a respective icon depicting a location, a heading and its feasibility.

20. The method of claim 19, further comprising, at the controller circuit:

identifying, when the aircraft is not permitted a speed change, infeasible target traffic as those neighboring aircraft from the second plurality of neighboring aircraft for which the aircraft cannot achieve the respective target location within the prescribed amount of time, based on the current speed of the aircraft;

presenting on the lateral image, each infeasible target indicated with a respective icon depicting a location, a heading and distinguishing its infeasibility;

determining, at the controller circuit, for each feasible target traffic, an overall feasibility based on its weight and its speed;

displaying, in the lateral image, a number alongside each icon for feasible target traffic, the number reflecting a rank in overall feasibility; and labeling each infeasible target traffic to indicate whether the infeasible target traffic is too heavy, too fast or too slow.

* * * * *